United States Patent
O'Connor et al.

(10) Patent No.: US 10,715,663 B2
(45) Date of Patent: *Jul. 14, 2020

(54) MANAGEMENT OF AGENT SESSIONS FOR OMNICHANNEL PREDICTIVE OUTBOUND

(71) Applicant: Avaya Inc., Santa Clara, CA (US)

(72) Inventors: Neil O'Connor, County Galway (IE); Amit Mishra, Broomfield, CO (US); Joel Ezell, Broomfield, CO (US)

(73) Assignee: Avaya Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/586,221

(22) Filed: Sep. 27, 2019

(65) Prior Publication Data

US 2020/0028966 A1 Jan. 23, 2020

Related U.S. Application Data

(63) Continuation of application No. 15/847,110, filed on Dec. 19, 2017, now Pat. No. 10,477,018.

(51) Int. Cl.
*H04M 3/51* (2006.01)
*G06N 7/00* (2006.01)
*G06Q 10/10* (2012.01)

(52) U.S. Cl.
CPC ....... *H04M 3/5158* (2013.01); *H04M 3/5141* (2013.01); *H04M 3/5191* (2013.01); *G06N 7/005* (2013.01); *G06Q 10/10* (2013.01); *H04M 2201/14* (2013.01); *H04M 2201/16* (2013.01); *H04M 2203/558* (2013.01)

(58) Field of Classification Search
CPC . H04M 3/5158; H04M 3/5141; H04M 3/5191
See application file for complete search history.

(56) References Cited

U.S. PATENT DOCUMENTS

| 8,634,543 B2 | 1/2014 | Flockhart et al. |
| 8,964,958 B2 | 2/2015 | Steiner |
| 9,300,482 B2 * | 3/2016 | Stoertenbecker ... H04L 12/1822 |

(Continued)

OTHER PUBLICATIONS

Senkova "Configuration Guide Contivity Secure IP Services Gateway," Nortel Networks Limited, Sep. 2003, 29 pages.

(Continued)

*Primary Examiner* — Nafiz E Hoque
(74) *Attorney, Agent, or Firm* — Sheridan Ross P.C.

(57) ABSTRACT

As "call centers" continue to be replaced with omnichannel contact centers, managing a plurality of simultaneous media channels becomes more important. Contacting a customer on one channel and, at the customer or agent's request, initiating a second channel that delays the interaction will having limited acceptance and, in some jurisdictions, may be illegal. By nailing-up an agent half-communication with a number of channels, agents maintain a perpetual connection comprising an agent half-communication to a server, such as one serving as a media anchor point, share point, etc. The customer half-connection is established to a server and the agent, already connected, is joined. As a result, the customer experiences a greatly reduced delay between the time they answer and being greeted by an agent, regardless of the media type or types utilized.

20 Claims, 8 Drawing Sheets

(56) References Cited

U.S. PATENT DOCUMENTS

| | | | |
|---|---|---|---|
| 2004/0235509 A1* | 11/2004 | Burritt | H04M 3/42195 455/519 |
| 2007/0192414 A1* | 8/2007 | Chen | H04L 29/04 709/205 |
| 2010/0235218 A1 | 9/2010 | Erhart et al. | |
| 2011/0125793 A1 | 5/2011 | Erhart et al. | |
| 2011/0125826 A1 | 5/2011 | Erhart et al. | |
| 2013/0051550 A1* | 2/2013 | Zgardovski | H04M 3/5158 379/266.08 |

OTHER PUBLICATIONS

Official Action for U.S. Appl. No. 15/847,110, dated Jan. 11, 2019, 9 pages.

Notice of Allowance for U.S. Appl. No. 15/847,110, dated Jul. 3, 2019 8 pages.

* cited by examiner

MANAGEMENT OF AGENT SESSIONS FOR OMNICHANNEL PREDICTIVE OUTBOUND

CROSS REFERENCE TO RELATED APPLICATION

The present application is a continuation of and claims priority to U.S. patent application Ser. No. 15/847,110, filed on Dec. 19, 2017, entitled "MANAGEMENT OF AGENT SESSIONS FOR OMNICHANNEL PREDICTIVE OUTBOUND." The entire disclosure of the application listed above is hereby incorporated by reference, in its entirety, for all that it teaches and for all purposes.

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for network management and particularly to establishing multiple-connections with single network nodes.

BACKGROUND

Outbound calls are generally performed with a predictive dialer. To minimize idle agents, calls are often made to parties knowing that only a certain number will be answered. Upon being answered, the calls are connected to human agents. This connection time is not instantaneous and often customers will answer the call only to find silence while an agent is being selected and joined to the call. Many jurisdictions have strict legislative constraints on the conduct of outbound campaigns that result in the need to "nail-up" connections to agents. A nailed-up call occurs when an agent is connected to a routing component of a contact center, even while not engaged in a call. As a result, a customer answering a call can quickly be connected to an agent who is already joined to the nailed-up call. While faster computers, switches, and other equipment helps to reduce the delay, it is still not instantaneous. Even in areas without such legislative regulations, customers receiving calls have a very high likelihood of abandoning the call if not greeted by an agent within a relatively short timeframe.

SUMMARY

These and other needs are addressed by the various embodiments and configurations of the present invention. The present invention can provide a number of advantages depending on the particular configuration. These and other advantages will be apparent from the disclosure of the invention(s) contained herein.

Prior art call centers are migrating to contact centers offering more than mere telephone services. Omnichannel contact centers are become more prevalent and provide a plurality of telephone, email, chat, video, co-browsing, and/or other media forms of communication. However, a problem often arises in that legislative compliance, as well as acceptable customer experience, require concurrent multiple media termination devices to be available at the same time for a given agent.

In one embodiment, a system is disclosed that uses parallel nail-up and anchoring of a contact center agent's multiple disparate media streams for the purpose of guaranteeing excellent user experience and expediting rapid establishment of concurrent sessions for an omnichannel outbound application.

Omnichannel refers to providing customer care in which a single customer and a single agent communicate with concurrent use of multiple media connections for their conversation, each connection providing a different type of media. Examples of this include a customer who initially sent a web chat message to the contact center and subsequently a voice or video session is added, allowing both text and voice to be exchanged between the agent and customer.

In one embodiment, an outbound omnichannel application originates a session that include multiple media type interactions, such as two or more of text, analog voice, digital voice, video, audio/video, co-browse, document sharing, etc., one or more of the interactions will result in an answer by the customer. When at least one interaction results in an answer, the concurrent media sessions will be established for a customer-side of the half-interaction of the agent-customer full-interaction or, more simply, "interaction."

In order to rapidly find and establish the concurrent media sessions with an agent, to which the agent-side half-interaction model is to be connected, a nail-up is disclosed in which the omnichannel agents that are participating in the outbound campaign are parties in an omnichannel nail-up. That is, for each participating agent, that agent's web chat, voice/video, file share, etc. are each connected in parallel to a chatroom, a media anchor, a file share space, etc., respectively. Hence the agent-side half-interaction is available to an omnichannel predictive algorithm. In a further embodiment one of the connections media types is a WebSocket type.

In another embodiment, the set of parallel connections, each of their own media type, is monitored and seeks to re-establish any one or more of the connections, such as due to a fault (e.g., disconnect, poor quality, etc.). The re-establishment may be based on a configuration from a set of business rules.

When an agent is selected by the system, the incoming parallel set of omnichannel answers from the customer side is bridged, in parallel, with the set of anchor-spaces of the corresponding set of omnichannel media of the agent-side half-interaction.

As a result, a rapid establishment of parallel media connections is made between a customer and an agent, which is often required by legislation motivated by today's voice-only systems and as may be required to provide an acceptable user experience.

In one embodiment, a system is provided, comprising: a network interface; a data storage; a processor, having access to the data storage and network interface; and the processor: accesses a first record maintained in the data storage comprising a connection address for each of a plurality of media type-specific connections for an agent endpoint; accesses a second record maintained in the data storage comprising a customer address for each of the plurality of media type-specific connections establishes, via the network interface, an agent half-connection, the agent half-connection being a connection between the agent endpoint and the processor utilizing each of the plurality of media type-specific connections; upon establishing the agent half-connection comprising each of the plurality of media type-specific connections, initiate, via the network interface, a customer half-connection via initiating contact with a customer device utilizing the customer address for one of the plurality of media type-specific connections; and upon establishing the customer half-connection for one of the plurality of media-specific connections, joining the agent half-connection with the customer half-connection comprising the one of the plurality of media type-specific connections.

In another embodiment, a method is disclosed, comprising: accessing, by a processor with access to a network interface and a data storage, a first record maintained in the data storage comprising a connection address for each of a plurality of media type-specific connections for an agent endpoint; accesses a second record maintained in the data storage comprising a customer address for each of the plurality of media type-specific connections establishes an agent half-connection, the agent half-connection being a connection between the agent endpoint and the processor utilizing each of the plurality of media type-specific connections; upon establishing the agent half-connection comprising each of the plurality of media type-specific connections, initiate a customer half-connection via initiating contact with a customer device utilizing the customer address for one of the plurality of media type-specific connections; and upon establishing the customer half-connection for one of the plurality of media-specific connections, joining the agent half-connection with the customer half-connection comprising the one of the plurality of media type-specific connections.

In another embodiment, a system is disclosed, comprising: a network interface; a data storage; a processor, having access to the data storage and network interface; and the processor: accesses a first record maintained in the data storage comprising a connection address for each of a plurality of media type-specific connections for an agent endpoint; accesses a second record maintained in the data storage comprising a customer address for each of the plurality of media type-specific connections establishes, via the network interface, an agent half-connection, the agent half-connection being a connection between the agent endpoint and the processor utilizing each of the plurality of media type-specific connections; maintaining, the agent half-connection, via a persistent connection with a media service, between the agent endpoint and the processor for each of the plurality of media type-specific connections; upon establishing the agent half-connection comprising each of the plurality of media type-specific connections, initiate, via the network interface, a customer half-connection via initiating contact with a customer device utilizing the customer address for one of the plurality of media type-specific connections; and upon establishing the customer half-connection for one of the plurality of media-specific connections, joining the agent half-connection, via the persistent connection, with the customer half-connection comprising the one of the plurality of media type-specific connections.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
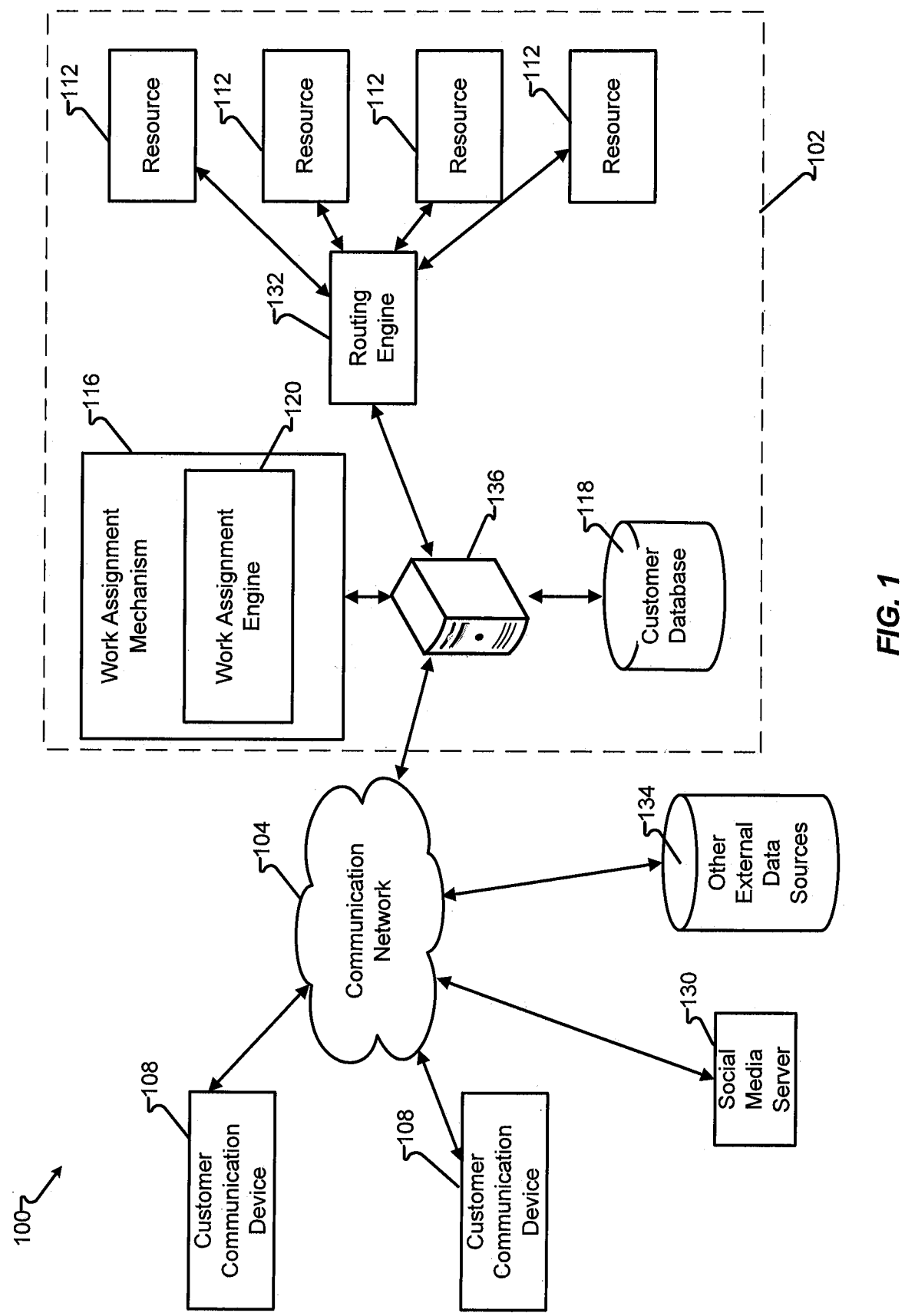
FIG. 1 depicts a first system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, either directly or via connection manager 136. Communication system 100 may be owned and operated by an enterprise administering contact center 102 in which a plurality of resources 112 is distributed to handle incoming work items (in the form of contacts) from customer communication devices 108.

Connection manager 136 is variously embodied and embodiments may be a discrete component, a shared component of contact center 102, a shared component of agent terminal 204, and/or a component located externally to contact center 102 (e.g., connected to a component of contact center 102 via communications network 104 and/or an internal network of contact center 102). Additionally or alternatively, contact center 102 may be a dialer (which may be a true dialer, placing calls on a public switched network, and/or to initiate/maintain additional or alternative media type-specific communications, such as Session Initiation Protocol (SIP) calls, video calls, chat, document sharing, co-browsing, etc.). In another embodiment, connection manager 136 may initiate, receive, or maintain customer channel 210 with customer communication device 121 for customer 214. In another embodiment, connection manager may comprise, or be comprised by, routing engine 132, work assignment mechanism 116, work assignment engine 120, and/or other component of contact center 102.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104 directly or via connection manager 136, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media website 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media network or server 130. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage elements may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
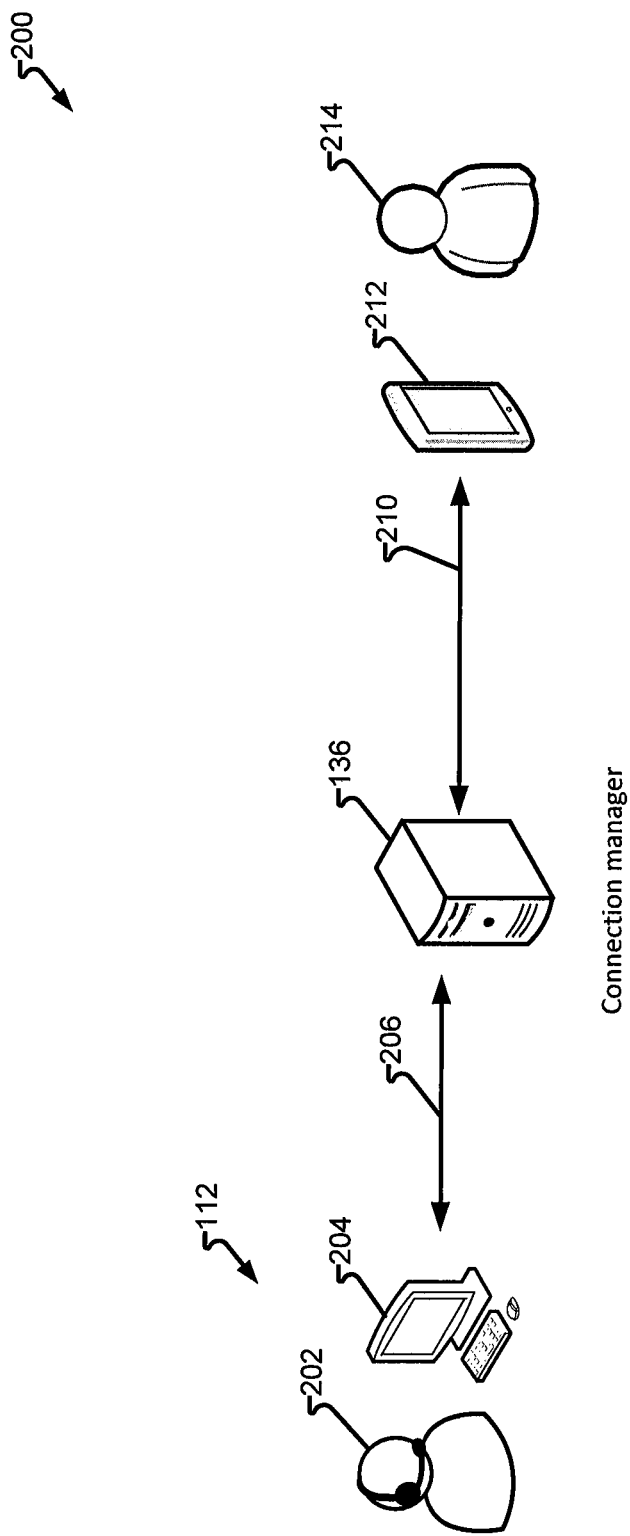
FIG. 2 depicts a second system in accordance with embodiments of the present disclosure.

FIG. 2 depicts system 200 in accordance with embodiments of the present disclosure. In one embodiment, resource 112 comprises agent 202 utilizing agent endpoint 204 to communicate, via a network interface (not shown) utilizing agent channel 206, with connection manager 136. Agent channel 206 may utilize a private and/or public network (e.g., Internet) and accommodate a plurality of media type-specific channels. Agent endpoint 204 may be embodied as a desktop, portable, tablet, smart phone, mobile, or other computer or computing/communication device operable to communicate utilize a plurality of media types. Additionally, agent endpoint 204 may comprise or utilize input-output devices, such as microphone, still camera, video camera, speakers, display, and/or other components to capture and/or output media provided by channel 206. For example, endpoint 204 may comprise or utilize a video camera (not shown) when agent channel 206 comprises a video media type-specific channel.

Customer communication device 212 may be an embodiment of customer communication device 108 when embodied as a multi-channel communication device (e.g., smart phone, computer, SIP phone with additional media types, etc.) operable to communicate in a plurality of media type-specific formats (e.g., text, audio, video, document sharing, co-browsing, etc.).

In one embodiment, agent channel 206 is perpetual in that it is established prior establishment of customer channel 210, maintained after customer channel 210 is terminated, or both. In a further embodiment, channel 206 is maintained during a plurality of communication sessions, during which a plurality of customer channels 210 are established and terminated for a plurality of customers 214. Agent channel 206 is a nailed-up communications connection between connection manager 136 and agent endpoint 204. A more detailed description of nailed-up communications and their configuration may be found in, "Configuration Guide Contivity Secure IP Services Gateway", available at "http://downloads.avaya.com/css/P8/documents/100099693."

In another embodiment, connection manager 136 may comprise or access customer database 118 (see, FIG. 1) and/or other data repository. Records, such as addresses of customer 214 with respect to one or more communication channels may be maintained. For example, customer 214 may have a telephone number of 123-456-7890, a text address of text@customer.com, a SIP address of sip:1-999-123-4567@voip-provider.example.net, etc. Additionally, database 118 and/or other data repository may maintain records of agent 202 and agent endpoint 204 to determine what communication channels are possible and/or available, such as to avoid attempting to connect agent 202 with customer 214 using media not enabled by agent endpoint 204.

In another embodiment, database 118 and/or other data repository may possess business rules to execute upon a fault in one or more channels. For example, if a current video (with audio) channel is underway but a text channel is either dropped, slow, or errant, a business rule may indicate that the text channel should be terminated and reestablished. Other rules may omit re-establishment, which could further be overridden by agent 202, client 214, and/or supervisor or other party of contact center 102. Alternatively, or additionally, a fault on one type-specific communication may, according to a rule, trigger a different type-specific communication to be established and/or joined. For example, video channel may be of unacceptable quality, dropped, and a telephone channel established and/or joined.

Figure 3:
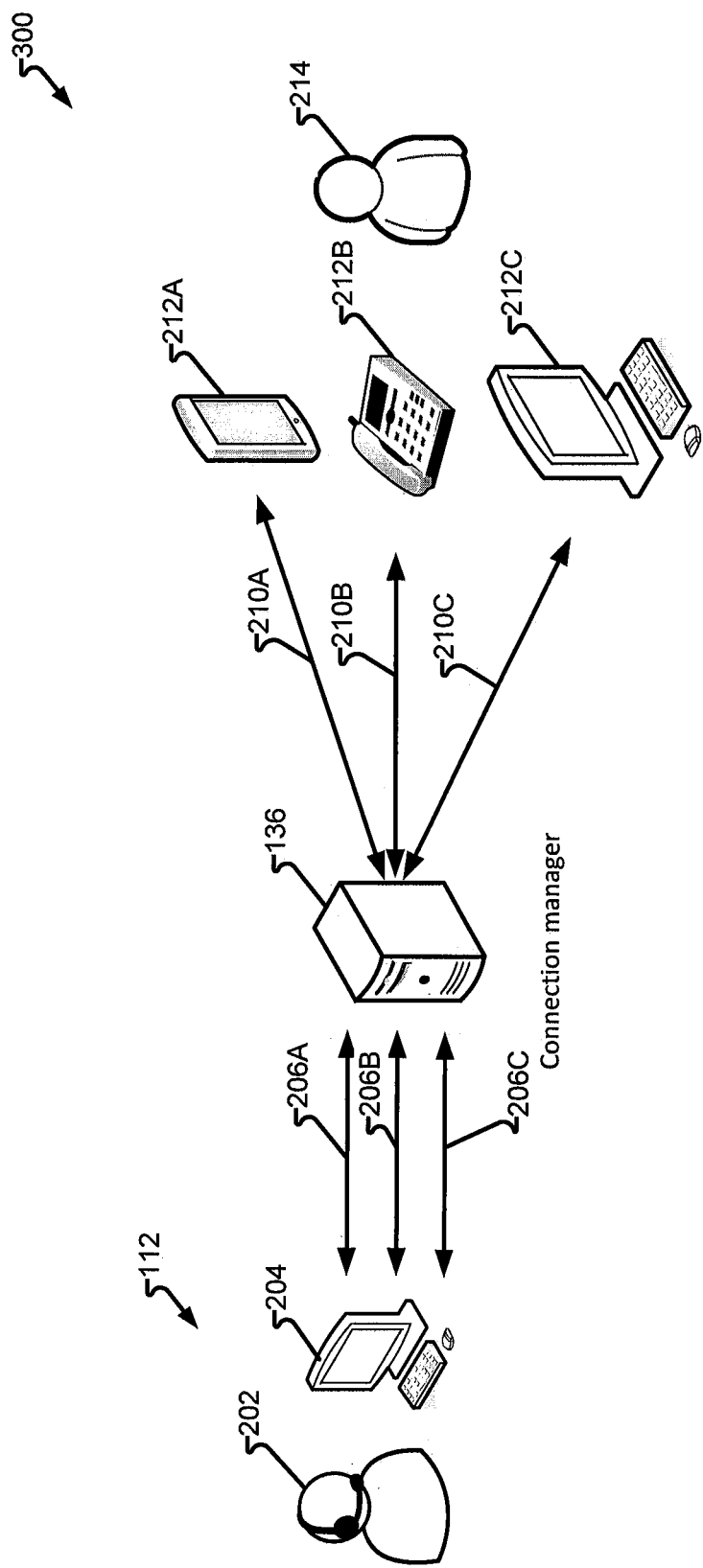
FIG. 3 depicts a third system in accordance with embodiments of the present disclosure.

FIG. 3 depicts system 300 in accordance with embodiments of the present disclosure. In one embodiment, system 300 depicts one network topology for communicating via nailed-up communications. System 300 comprises certain components described with respect to system 200 (see, FIG. 2), which may be modified as described. In one embodiment, agent endpoint 204 communicates with connection manager 136 via a plurality of agent channels 206A-C. Each of agent channels 206A-C may be a single media type-specific communication or shared with two or more media type-specific communications. For example, 206A may be a video connection, 206B may be a document sharing connection, and 206C may be a text, email, and co-browsing connection.

In another embodiment, customer 214 may utilize a plurality of customer devices 212, including, but not limited to, smart phone 212A, SIP phone 212B, and desktop computer 212C. Accordingly, connection manager 136 may utilize a plurality of customer channels, such as customer channels 212A-C which may be a single media type-specific communication or shared with two or more media type-specific communications. For example, 210A may be a video connection, 210B may be a SIP audio connection, and 210C may be a text, email, and co-browsing connection. For example, agent 202 may be engaged in a text communication with customer 212, via a text-specific communication and utilizing desktop computer 212C. A subsequent communication, utilizing voice and SIP telephone 212B may be utilized and/or a video session with smart phone 212A.

Figure 4:
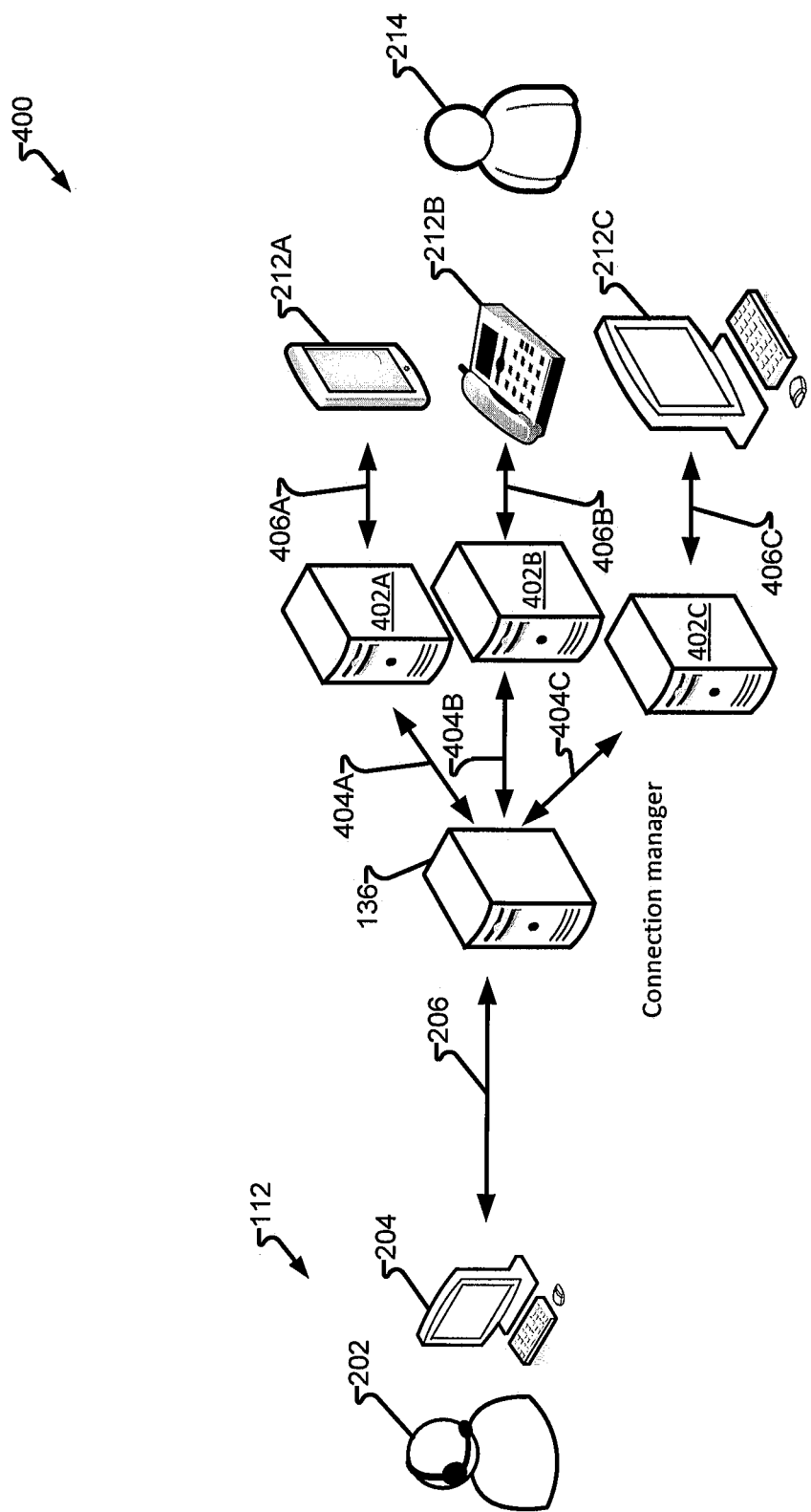
FIG. 4 depicts a fourth system in accordance with embodiments of the present disclosure.

FIG. 4 depicts system 400 in accordance with embodiments of the present disclosure. In one embodiment, system 400 depicts one network topology for communicating via nailed-up communications. System 400 comprises certain components described with respect to system 400 (see, FIG. 2), which may be modified as described. In one embodiment, system 400 utilizes a distributed network topology comprising a plurality of media servers 402 each providing at least one media type-specific communication different from another of the plurality of media servers 402. Each of the plurality of media servers 402 interact with connection manager 136 via server channels 404, for example, media server 402A utilizes server channel 404A, media server 402B utilizes media server 404B, and media server 404C utilizes connection channel 404C.

In another embodiment, each of media servers 404A-C utilize their own server-client communication channel 406A-C, respectively, such as to communicate with particular customer devices 212A-C, also respectively. In another embodiment, at least one media server 404A-C may utilize a shared server-client communication channel 406, for example, media server 402C may be able to communicate directly with customer communication device 212C and 212B.

In another embodiment, each of media servers 402A-C may comprise their own nail-up service, such as a file share, media anchor, etc. with agent endpoint 204.

Figure 5:
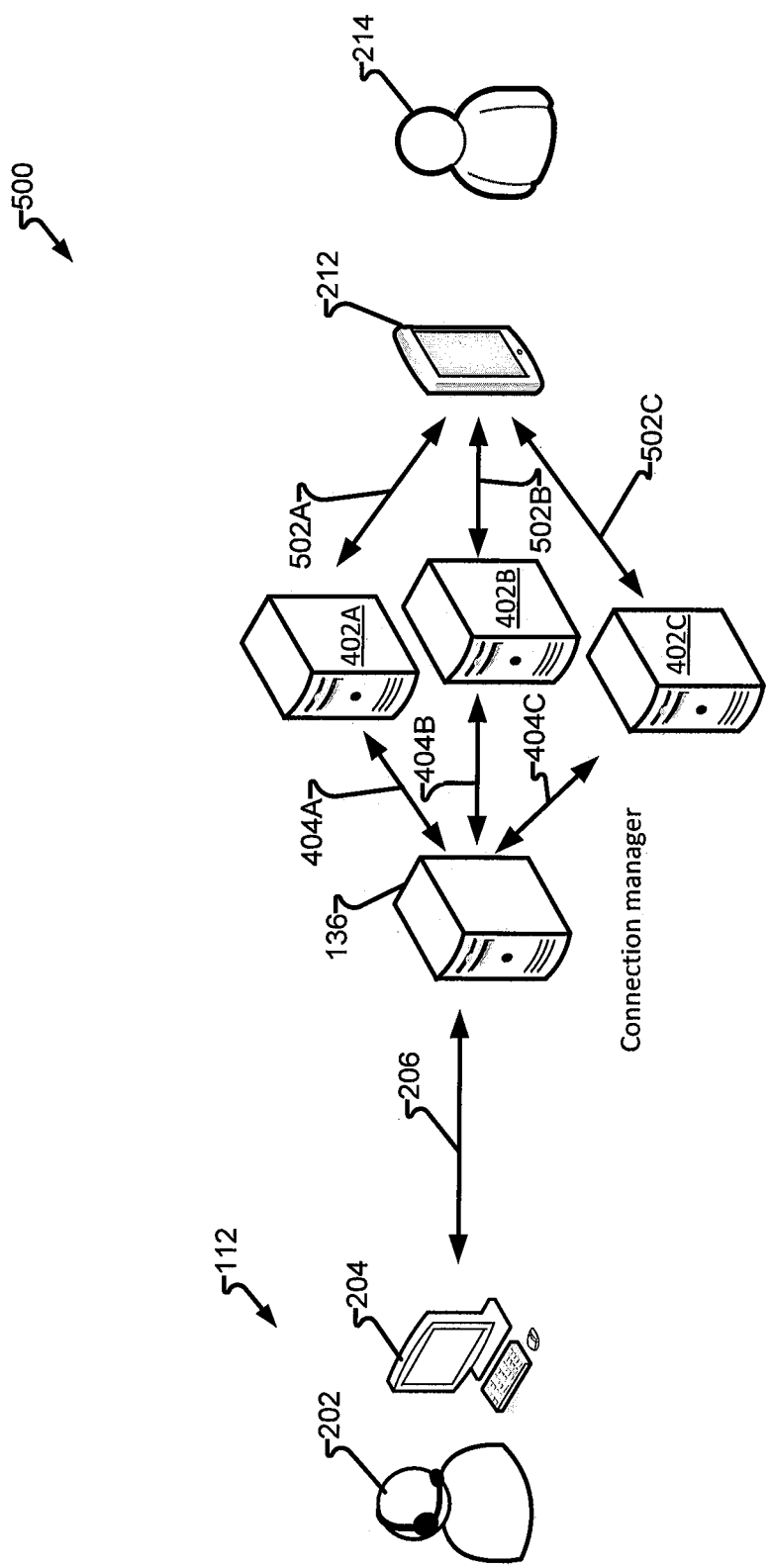
FIG. 5 depicts a fifth system in accordance with embodiments of the present disclosure.

FIG. 5 depicts system 500 in accordance with embodiments of the present disclosure. In one embodiment, system 500 depicts one network topology for communicating via nailed-up communications. System 500 comprises certain components described with respect to system 200 (see, FIG. 2), which may be modified as described. In one embodiment, each media server 404A-C may utilize their respective server-client communication channel 406A-C to communicate directly with customer communication device 212.

In another embodiment, each of media servers 402A-C may comprise their own nail-up service, such as a file share, media anchor, etc. with agent endpoint 204.

Figure 6:
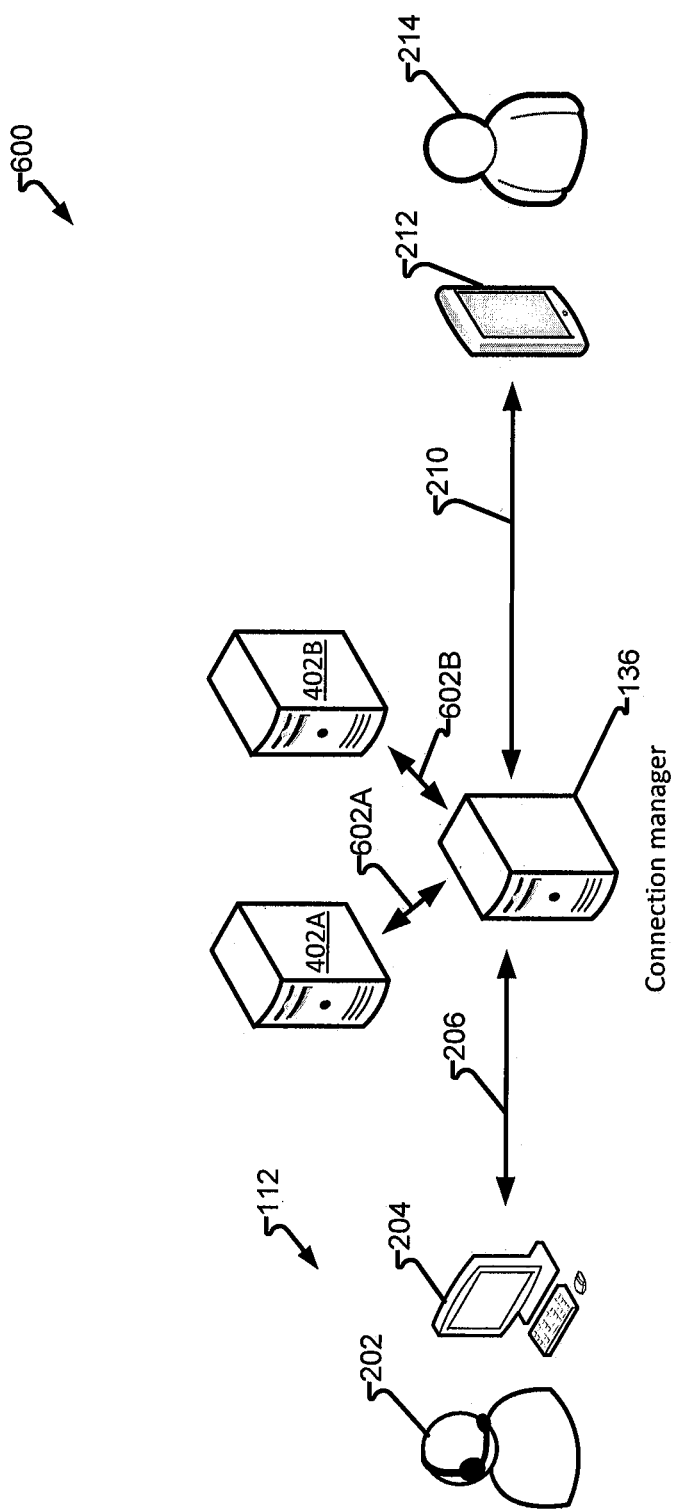
FIG. 6 depicts a sixth system in accordance with embodiments of the present disclosure.

FIG. 6 depicts system 600 in accordance with embodiments of the present disclosure. In one embodiment, system 600 depicts one network topology for communicating via nailed-up communications. System 600 comprises certain components described with respect to system 400 (see, FIG. 2), which may be modified as described. In one embodiment, system 600 utilizes at least one media server 402, such as media server 402A-B, to facilitate nail-up services for at least one media type. Communications between connection manager 136 and customer communication device 212 are maintained with customer channel 210. However, connection manager 136 may utilize media servers 402 to maintain a nailed-up connection with agent endpoint 204.

Figure 7:
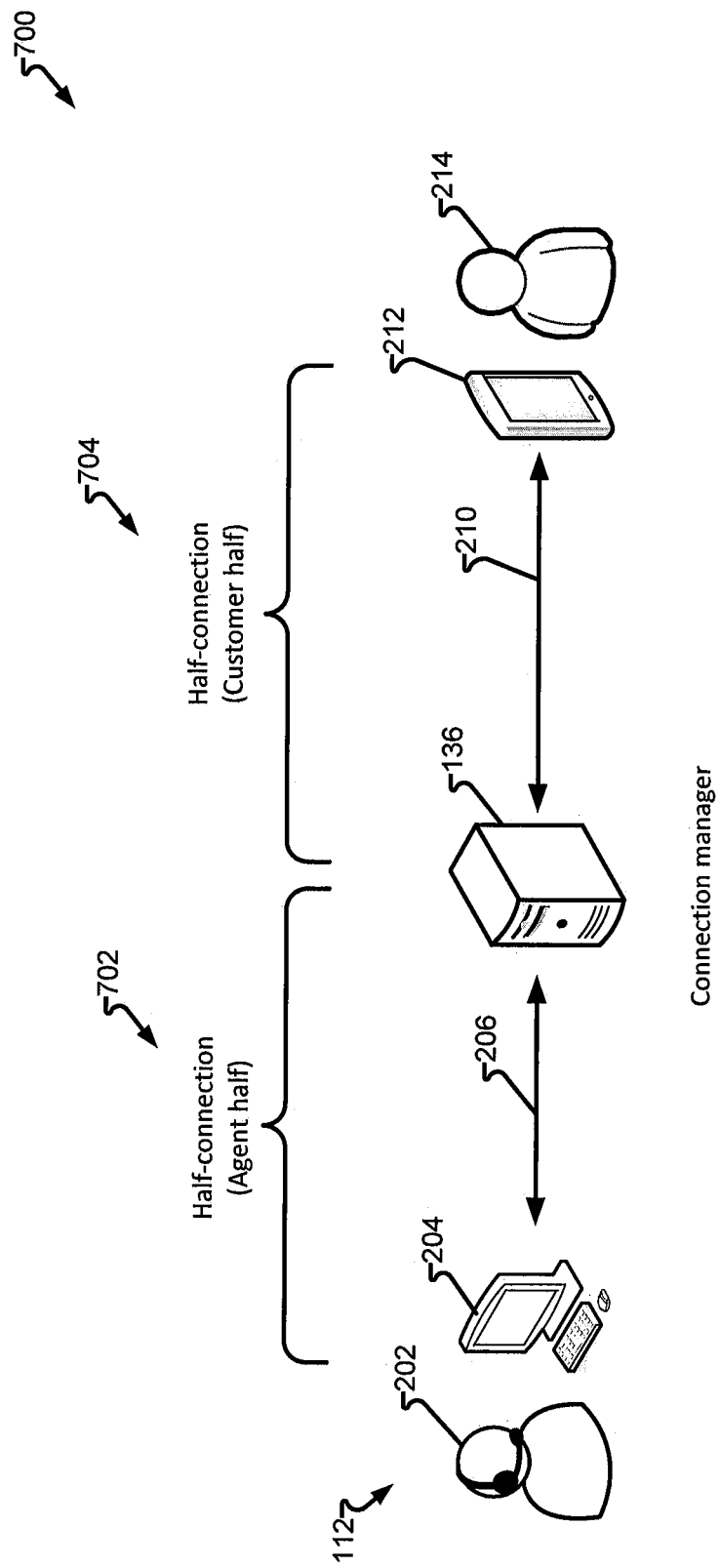
FIG. 7 depicts a seventh system in accordance with embodiments of the present disclosure.

FIG. 7 depicts system 700 in accordance with embodiments of the present disclosure. In one embodiment, system 700 depicts one network topology for communicating via nailed-up communications. System 700 comprises certain components described with respect to system 400 (see, FIG. 2), which may be modified as described. In one embodiment, system 700 illustrates agent half-connection 702 and customer half-connection 704 which are then bridged by connection manager 136. While customer half-connection 704 may be setup and torn down repeatedly, for specific calls wither to repeat instances of customer 214 or to alternative customers 214, agent half-connection 702 remains connected between agent endpoint 204 and connection manager 136.

Figure 8:
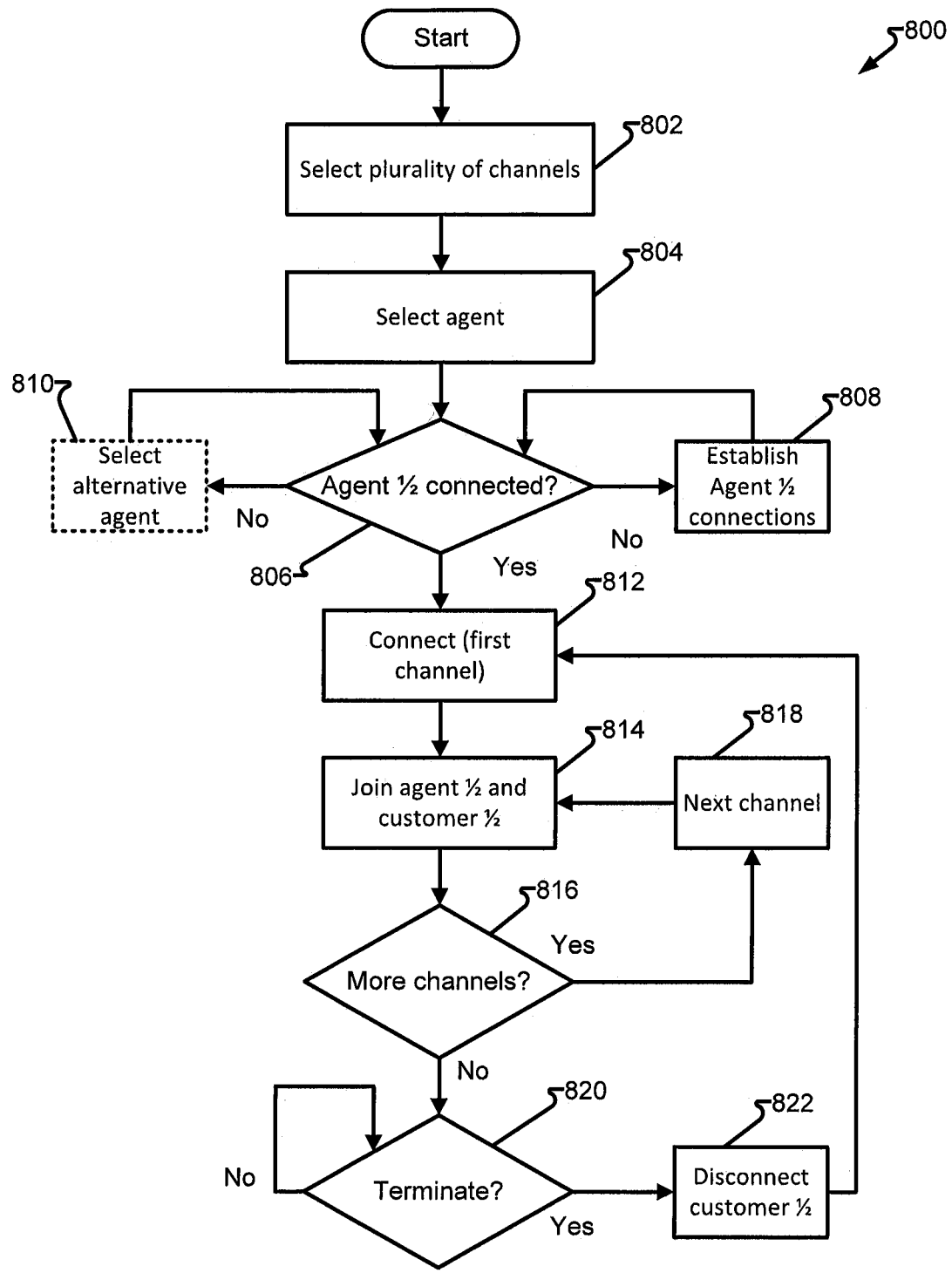
FIG. 8 depicts a process in accordance with embodiments of the present disclosure.

FIG. 8 depicts a process 800 in accordance with embodiments of the present disclosure. In one embodiment, process 800 is performed by a processor, such as a processor in connection manager 136, media server 402, agent endpoint 204, or a combination thereof. Process 800 begins with step 802 selecting a particular plurality of channels. Step 804 selects an agent having the ability, via agent endpoint 204, to communicate via the channels selected in step 802. Step 806 verifies whether the agent, via agent device 204, is engaged in an active agent half-connection, such as with connection manager 136. If step 806 is determined in the negative, step 808 may be performed to establish the agent half-connection. The agent half-connection may be disconnected, such as due to a fault, agent shift ending, etc., having the agent half-connection being nailed-up and persistent, such that once established, a plurality of customer interactions are initiated, conducted, and disconnected without disconnecting the agent half connection.

In one embodiment, the agent half-connection may be a plurality of media types (e.g., phone, video, text, co-browse, document share, etc.). When a customer is connected, via contact center 102 or by customer device 212, the media type(s) utilized by the customer are then connected in the full interaction, utilizing only the media types provided by both client device 212 and agent endpoint 204.

Alternatively, or additionally, step 806, when determined in the negative, may then cause process 800 to execute step 810 to select an alternative agent, such as one having a different capacity and/or established agent half-connection. It should be appreciated that many alternative configurations may be implemented, such as to reserve a portion of the agent's half-connection. For example, selected agent 202 may be required to have a video and text channel nailed-up to connection manager 136 (or other component as described herein). If the particular agent 202 only has a text channel available, a work item may be enqueued for the agent to reserve the video channel. When the video channel becomes available, the video channel is nailed-up an and the agent is selected for a particular interaction for a customer or group of customers.

Step 812 connects the customer, such as customer 214 via customer communication device 212. In another embodiment, customer 214 initiates the contact and, therefore, may perform step 812. Next, step 816 joins the agent's half-connection and the customer's half-connection with respect to the first channel. Steps 816 determine if more channels are to be added and, if so, a next channel selected in step 818, which is then joined. In another embodiment, the agent's half-connection and the customer half-connection comprise a plurality of media types and are joined simultaneously in step 814.

Upon completion of the agent-customer interaction, step 802 is determined in the affirmative, else loops until true. Then, in step 822 the customer half-connection is discontinued while the agent half-connection remains. Process 800 may then continue back to step 812 where the agent, still engaged in the agent half-connection, may then interact with another customer. Alternatively, step 806 may follow step 806 to verify the agent is still connected via the same agent half-connection and, if not, perform step 808 to establish the agent half-connection or step 810 to select an alternative agent.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (e.g., GPU, CPU), or logic circuits programmed with the instructions to perform the methods (e.g., FPGA). In another embodiment, a processor may be a system or collection of processing hardware components, such as a processor on a client device and a processor on a server, a collection of devices with their respective processor, or a shared or remote processing service (e.g., "cloud" based processor). A system of processors may comprise task-specific allocation of processing tasks and/or shared or distributed processing tasks. In yet another embodiment, a processor may execute software to provide the services to emulate a different processor or processors. As a result, first processor, comprised of a first set of hardware components, may virtually provide the services of a second processor whereby the hardware associated with the first processor may operate using an instruction set associated with the second processor.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., processors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a processor may comprise a first processor on one component and a second processor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
a network interface; and
a processor, having access to data storage and the network interface; and wherein the processor:
  establishes, via the network interface, an agent half-connection, the agent half-connection being a connection with the agent endpoint and wherein the processor utilizes each of a plurality of media type-specific connections;
  initiates, via the network interface, a customer half-connection via initiating contact with a customer device utilizing a customer address for one of the plurality of media type-specific connections;
  upon establishing the customer half-connection for one of the plurality of media-specific connections, joins the agent half-connection with the customer half-connection comprising the one of the plurality of media type-specific connections; and
  upon joining the agent half-connection with the customer half-connection, joins the agent half-connection with the customer half-connection comprising another one of the plurality of media type-specific connections different from the one of the plurality of media type-specific connections.

2. The system of claim 1, wherein the processor performs the joining of the customer half-connection, in response to receiving a signal from at least one of the agent endpoint or the customer device indicating a desire to add the another one of the plurality of media type-specific connections.

3. The system of claim 1, wherein joining the agent half-connection with the customer half-connection further comprises joining the agent half-connection with the customer half-connection comprising another one of the plurality of media type-specific connections.

4. The system of claim 1, further comprising the processor disconnecting the joined agent half-connection and client half-connection, comprising disconnecting the customer half-connection while maintaining agent-half connection.

5. The system of claim 1, wherein, upon a fault in the one of the plurality of media type-specific connections, reconnecting at least one of agent half-connection or the client half connection for the one of the plurality of media type-specific connections.

6. The system of claim 1, wherein the processor initiates the customer half-connection via initiating contact with the customer device utilizing the customer address for the one of the plurality of media type-specific connections, further comprising simultaneously initiating contact with the customer device utilizing a customer address for another one of the plurality of media type-specific connections.

7. The system of claim 6, wherein, upon establishing the customer half-connection comprising at least the one or the another of the plurality of media-specific connections, joining the agent half-connection with the customer half-connection comprising the at least the one or the another of the plurality of media-specific connections.

8. The system of claim 1, wherein the one of the plurality of media-specific connections comprises a media type different from a media type of the another one of the plurality of media-specific connections is selected from a different one of text, analog voice, digital voice, video, audio/video, co-browse, or document sharing.

9. The system of claim 1, wherein the one of the plurality of media-specific connections comprises a media type selected from text, analog voice, digital voice, video, audio/video, co-browse, or document sharing and the another one of the plurality of media-specific connections is selected from a different one of text, analog voice, digital voice, video, audio/video, co-browse, or document sharing.

10. A method, comprising:
  establishing an agent half-connection, the agent half-connection being a connection between an agent endpoint and a processor utilizing each of a plurality of media type-specific connections;
  initiating a customer half-connection via initiating contact with a customer device utilizing a customer address for one of the plurality of media type-specific connections;
  upon establishing the customer half-connection for one of the plurality of media-specific connections, joining the agent half-connection with the customer half-connection comprising the one of the plurality of media type-specific connections; and
  upon joining the agent half-connection with the customer half-connection, joining the agent half-connection with the customer half-connection comprising another one of the plurality of media type-specific connections different from the one of the plurality of media type-specific connections.

11. The method of claim 10, further comprising:
  receiving a signal from at least one of the agent endpoint or the customer device indicating a desire to add the another one of the plurality of media type-specific connections; and
  in response to the signal, joining the customer half-connection comprising another one of the plurality of media type-specific connections.

12. The method of claim 10, wherein joining the agent half-connection with the customer half-connection further comprises joining the agent half-connection with the customer half-connection comprising another one of the plurality of media type-specific connections.

13. The method of claim 10, further comprising:
  disconnecting the joined agent half-connection and client half-connection comprising disconnecting the client half-connection while maintaining the connection between the agent endpoint and the processor utilizing each of the plurality of media type-specific connections.

14. The method of claim 10, further comprising:
  determining a fault with the one of the plurality of media type-specific connections; and
  reconnecting at least one of agent half-connection or the client half connection for the one of the plurality of media type-specific connections.

15. The method of claim 10, wherein initiating, by the processor, the customer half-connection via initiating contact with the customer device utilizing the customer address for the one of the plurality of media type-specific connections, further comprising simultaneously imitating contact with the customer device utilizing the customer the address for another one of the plurality of media type-specific connections.

16. The method of claim 10, wherein the one of the plurality of media-specific connections comprises a media type selected from text, analog voice, digital voice, video, audio/video, co-browse, or document sharing and the another one of the plurality of media-specific connections is selected from a different one of text, analog voice, digital voice, video, audio/video, co-browse, or document sharing.

17. A system, comprising:
  a processor, having access to data storage and a network interface; and
  the processor:
    establishes, via the network interface, an agent half-connection, the agent half-connection being a connection with the agent endpoint and wherein the processor utilizes each of the plurality of media type-specific connections;

maintaining, the agent half-connection, via a persistent connection with a media service, between the agent endpoint and the processor for each of the plurality of media type-specific connections;

initiating, via the network interface, a customer half-connection via initiating contact with a customer device utilizing a customer address for one of the plurality of media type-specific connections;

upon establishing the customer half-connection for one of the plurality of media-specific connections, joining the agent half-connection, via the persistent connection, with the customer half-connection comprising the one of the plurality of media type-specific connections; and upon joining the agent half-connection with the customer half-connection, joining the agent half-connection with the customer half-connection comprising another one of the plurality of media-specific connections different from the one of the plurality of media type-specific connections.

18. The system of claim 17, wherein the media service comprises a first media service, maintaining the persistent connection between the agent endpoint and the processor for one of the plurality of media type-specific connections and a second media service, maintaining the persistent connection between the agent endpoint and the processor for the another of the plurality of media type-specific connections.

19. The system of claim 17, wherein the one of the plurality of media-specific connections comprises a media type selected from text, analog voice, digital voice, video, audio/video, co-browse, or document sharing and the another one of the plurality of media-specific connections is selected from a different one of text, analog voice, digital voice, video, audio/video, co-browse, or document sharing.

20. The system of claim 17, wherein the processor disconnects the joined agent half-connection and client half-connection comprises disconnecting the client half-connection while maintaining the persistent connection.

* * * * *